US006183045B1

(12) United States Patent
Marfilius et al.

(10) Patent No.: US 6,183,045 B1
(45) Date of Patent: Feb. 6, 2001

(54) METHOD OF MANUFACTURING AN INTERIOR AUTOMOTIVE COMPONENT AND COMPONENTS MADE THEREFROM

(75) Inventors: Donald F. Marfilius, Farmington Hills; Randall E. Szalma, Howell; Richard Johnson, Farmington Hills, all of MI (US)

(73) Assignee: Magna Interior Systems Inc., Ontario (CA)

( * ) Notice: Under 35 U.S.C. 154(b), the term of this patent shall be extended for 0 days.

(21) Appl. No.: 09/325,299

(22) Filed: Jun. 3, 1999

Related U.S. Application Data
(60) Provisional application No. 60/087,786, filed on Jun. 3, 1998.

(51) Int. Cl.⁷ ...................................................... A47C 7/38
(52) U.S. Cl. ........................... 297/391; 297/408; 297/410; 297/220
(58) Field of Search .................................. 297/408, 410, 297/391, 218.1, 218.2, 220

(56) References Cited

U.S. PATENT DOCUMENTS

| | | | | |
|---|---|---|---|---|
| 3,429,615 | * | 2/1969 | Belk | 297/408 X |
| 3,592,508 | * | 7/1971 | Druseikis | 297/410 X |
| 4,097,038 | | 6/1978 | Jansen . | |
| 4,099,779 | * | 7/1978 | Goldner | 297/408 |
| 4,191,423 | * | 3/1980 | Goldner | 297/408 |
| 4,247,961 | | 2/1981 | Masch et al. . | |
| 4,256,341 | * | 3/1981 | Goldner et al. | 297/408 X |
| 4,370,898 | * | 2/1983 | Maruyama | 297/408 X |
| 4,440,443 | | 4/1984 | Nordskog . | |
| 4,744,601 | * | 5/1988 | Nakanishi | 297/391 |
| 4,858,994 | * | 8/1989 | Yamashita | 297/391 |
| 5,024,481 | | 6/1991 | Swersky . | |
| 5,123,704 | | 6/1992 | Peterson . | |
| 5,228,749 | * | 7/1993 | Harrell | 297/408 |
| 5,255,955 | | 10/1993 | Matosic . | |
| 5,257,853 | * | 11/1993 | Elton et al. | 297/391 |
| 5,316,372 | * | 5/1994 | Amner | 297/391 X |
| 5,405,190 | * | 4/1995 | Jeffcoat et al. | 297/391 |
| 5,478,136 | * | 12/1995 | Takeuchi et al. | 297/391 |
| 5,664,840 | * | 9/1997 | Stenzel | 297/391 |
| 5,700,057 | * | 12/1997 | De Filippo | 297/408 |
| 5,820,222 | * | 10/1998 | De Filippo | 297/220 X |
| 5,842,738 | * | 12/1998 | Knoll et al. | 297/408 X |
| 6,007,154 | * | 12/1999 | Parker et al. | 297/410 |
| 6,079,776 | * | 6/2000 | Breitner et al. | 297/408 X |

FOREIGN PATENT DOCUMENTS

| | | | | |
|---|---|---|---|---|
| 2945060 | * | 5/1981 | (DE) | 297/408 |
| 2240920 | * | 8/1991 | (GB) | 297/408 |
| 0058191 | * | 4/1985 | (JP) | 297/410 |
| 406304042 | * | 11/1994 | (JP) | 297/408 |
| 406304043 | * | 11/1994 | (JP) | 297/408 |

* cited by examiner

Primary Examiner—Peter R. Brown
Assistant Examiner—Rodney B. White
(74) Attorney, Agent, or Firm—Howard & Howard

(57) ABSTRACT

An automotive interior component, such as a headrest or armrest, including a U-shaped tubular support frame for supporting the interior component. A blow molded or injection molded bun is molded directly onto a portion of the frame structure. A resilient urethane foam pad is secured to a surface of a fabric, vinyl or leather trim cover and the molded bun is enveloped by the trim cover and foam pad. Alternatively, the molded pad is formed by first and second half shell with the frame structure received and secured between the half shells. The half shells and interconnected with the frame structure there between and enveloped by the trim cover and foam pad. A method of manufacturing the interior component includes placing the frame structure in a mold, molding the rigid bun about a portion of the frame structure to form the contoured shape of the interior component, removing the rigid bun and frame structure from the mold, securing a resilient foam pad onto a surface of a trim cover, and enveloping the rigid bun in the trim cover and foam pad.

7 Claims, 3 Drawing Sheets

METHOD OF MANUFACTURING AN INTERIOR AUTOMOTIVE COMPONENT AND COMPONENTS MADE THEREFROM

This application claims the benefit of U.S. Provisional No. 60/087,786 filed Jun. 3, 1998.

BACKGROUND OF THE INVENTION

1) Technical Field

The subject invention relates to a method for manufacturing an interior automotive component such as a headrest or armrest and to the interior automotive components made using the method of the present invention.

2) Description of the Prior Art

Interior automotive components, such as headrests and armrests, can be manufactured using a variety of manufacturing methods. The components generally comprise a frame structure, a foam bun and a trim cover. Foam-in-place technology has been used successfully to produce luxury headrests. Additionally, injection molded or blow molded components have been used for attachment to the frame structure. However, the interior components which incorporate the molded components still require the use of a foam bun to produce the desired shaping of the interior component.

The disadvantages of the prior art may be overcome by providing an interior component having a molded "bun" molded directly onto a frame structure to be integrated therewith and then covering the molded "bun" with a trim cover having a flexible pad.

SUMMARY OF THE INVENTION

An automotive interior component comprises a frame structure for supporting the interior component and a rigid molded contoured bun secured about a portion of the frame structure forming the desired shape of the interior component. A trim cover envelops the bun and a foam pad is secured between the trim cover and the bun for providing resilient padding to the interior component.

A method of manufacturing an automotive interior component supported on a frame structure is also provided and comprises the steps of placing the frame structure in a mold, molding a rigid bun about a portion of the frame structure to form the contoured shape of the interior component, removing the rigid bun and frame structure in a mold, molding a rigid bun about a portion of the frame structure to form the contoured shape of the interior component, removing the rigid bun and frame structure from the mold, securing a resilient foam pad onto a surface of a trim cover, and enveloping the rigid bun in the trim cover and foam pad.

The interior component is essentially foamless except for the foam attached to the trim cover.

BRIEF DESCRIPTION OF THE DRAWINGS

Other advantages of the present invention will be readily appreciated as the same becomes better understood be reference to the following detailed description when considered in connection with the accompanying drawings wherein.

DETAILED DESCRIPTION OF THE INVENTION

Figure 2:
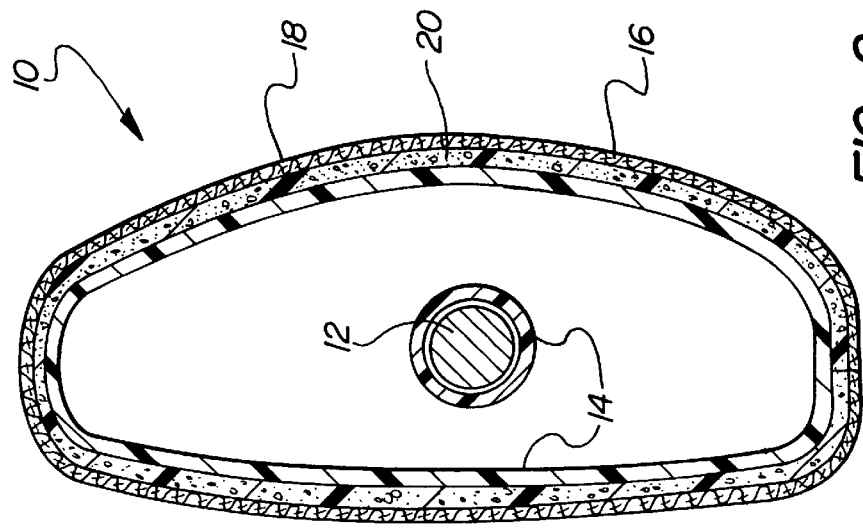
FIG. 2 is side sectional view of the headrest of FIG. 1.
Figure 1:
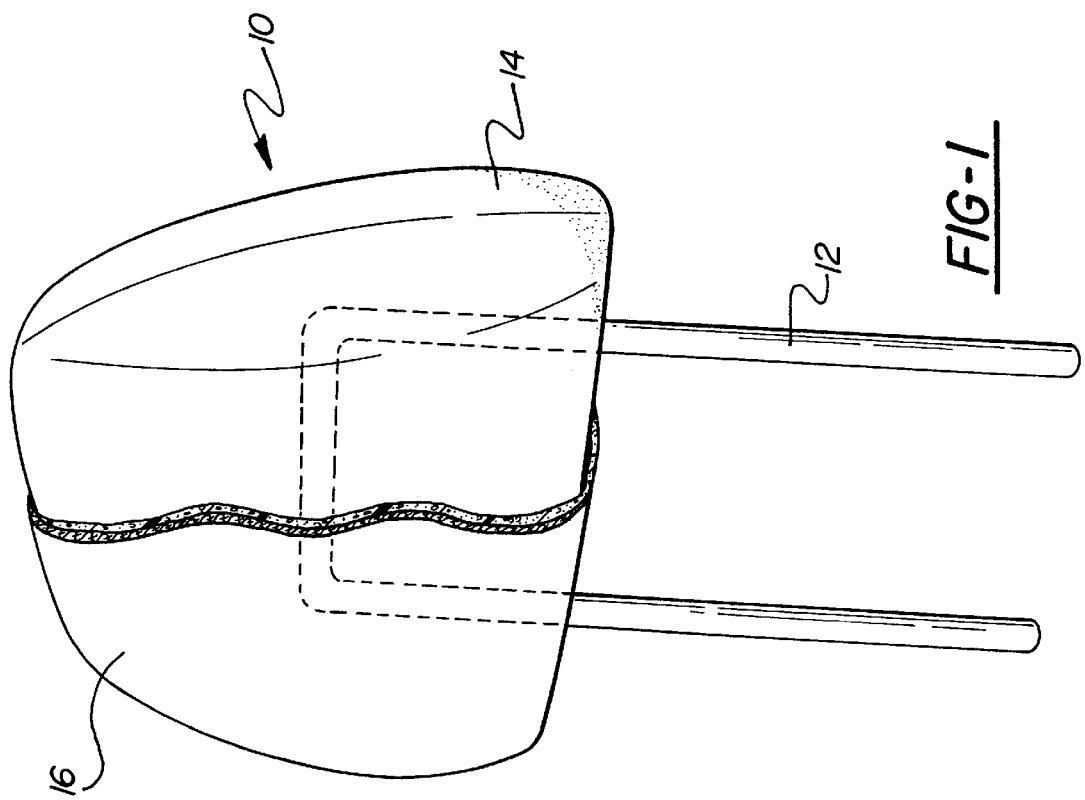
FIG. 1 is a perspective view, partially broken away, of a headrest of the present invention.

Referring to the Figures, wherein like numerals indicate like or corresponding parts throughout the several views, an interior component 10 of the present invention generally comprises a U-shaped tubular frame structure 12, a molded "bun" 14 and a trim cover 16. In FIG. 1, the interior component is a headrest. However, it is readily apparent to those skilled in the art that other interior automotive components, such as armrests, are also included in the present invention.

The tubular frame structure 12 is conventional in design. Tubular frame structure 12 is generally U-shaped and can be solid or hollow. The end posts of the frame structure 12 are spaced to engage with mounts in the top of a conventional seat back as is commonly known in the art.

Molded about the bight of the U-shape of the frame structure 12 is a molded "bun" 14 having an outer surface and an inner surface defining a hollow cavity. Molded "bun" 14 can be blow molded or injection molded in a conventional manner. The frame structure 12 is inserted into the mold and then the "bun" 14 is molded about the frame structure 12. In this manner the "bun" 14 becomes fully integrated with the frame structure 12.

Molded "bun" 14 can be molded using recycled or reclaimed material and thus has the advantage of being environmentally friendly. The preferred materials include ABS, polyethylene and polypropylene.

Surrounding the molded "bun" 14 is trim cover 16. The trim cover 16 has an interior surface and an exterior surface. The exterior surface comprises an outer skin 18 made of a fabric or vinyl material. Bonded to the interior surface of the outer skin 18 is a foam pad 20. The foam pad 20 is preferably a flexible urethane pad of a substantially constant thickness which is flame laminated, bonded, or tack sewn to the outer skin 18. The outer skin 18 is preferably sewn in a conventional manner into a pouch. The pouch is applied over top of the molded "bun" 14 and then closed on the underside of the "bun" 14 in a conventional manner. Optionally, the molded "bun" 14 can have slots, recesses or other attachment features molded therein for closing out the trim cover 16.

The thickness of the foam pad 20 and the type of outer skin will determine how luxurious the feel of the interior component 10 will have. A relatively thick foam pad 20 coupled with a crushed velour outer skin 20 will produce a feel comparable with a foam-in-place interior component, at a significantly less production cost.

Figure 3:
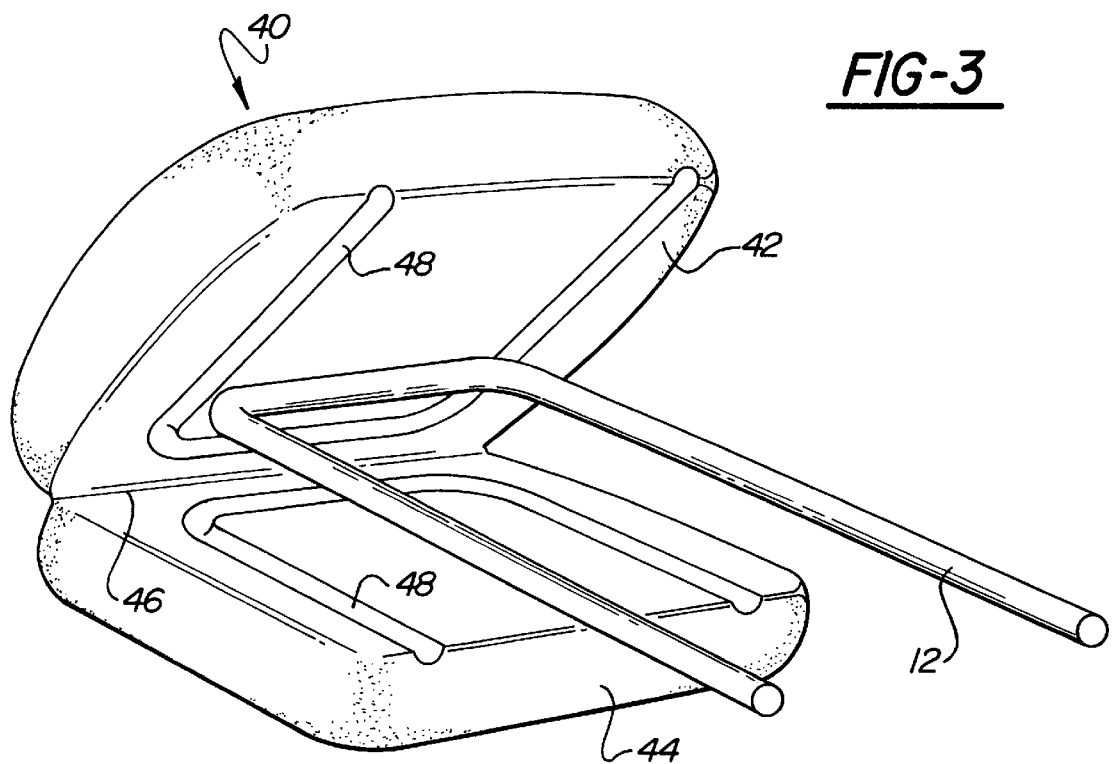
FIG. 3 is a perspective view of a headrest of a second embodiment of the present invention.

Referring to FIG. 3, a second embodiment of the present invention is illustrated wherein a molded "bun" 40 is shown comprising two hollow half shells 42, 44 joined by a living hinge 46. The half shells 42, 44 have complementary grooves 48 molded on the inside face for receiving the frame structure 12. Grooves 48 receive the frame structure 12.

The frame structure 12 is placed in the molded "bun" 40 on the grooves 48. The half shells 42, 44 are joined together in a suitable fashion to lock the molded "bun" 40 about the frame structure 12. Suitable methods for locking the half shells 42, 44 together include ultrasonic welding or molding a locking tab and recess on opposite shells. Once the molded "bun" 40 is fully integrated, a trim cover as described above is applied to and closed about the molded "bun" 40.

Figure 4:
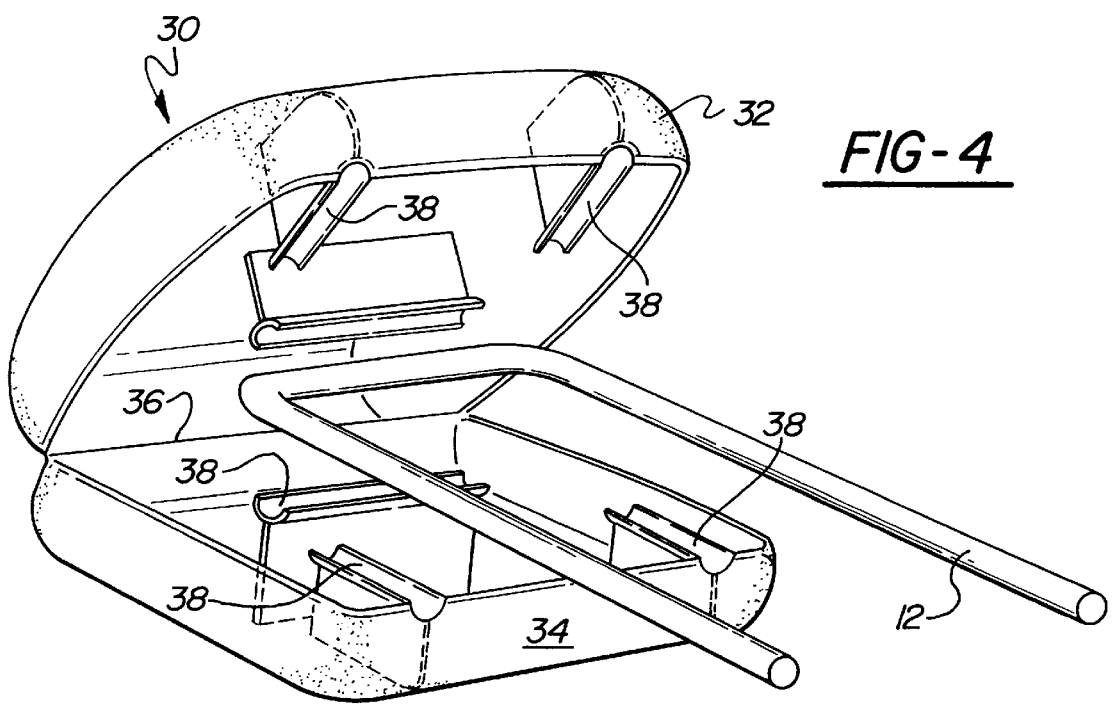
FIG. 4 is a perspective view of a headrest of a third embodiment of the present invention.

Referring to FIG. 4, a third embodiment of the present invention is illustrated. In the third embodiment, the molded "bun" 30 comprises two half shells 32, 34 joined by a living hinge 36. The half shells 32, 34 have inserts 38 molded on the inside face for receiving the frame structure 12. Inserts 38 have arcuate sleeves for receiving the frame structure 12. The inserts 38 prevent the molded "bun" 30 from rotating relative to the frame structure 12 during use or impact.

The frame structure 12 is placed in the molded "bun" 30 on the inserts 38. The half shells 32, 34 are joined together in a suitable fashion to lock the molded "bun" 30 about the frame structure 12. Suitable methods for locking the half shells 32, 34 together include ultrasonic welding or molding a locking tab and recess on opposite shells. Once the molded "bun" 30 is fully integrated, a trim cover as described above is applied to and closed about the molded "bun" 30.

Figure 5:
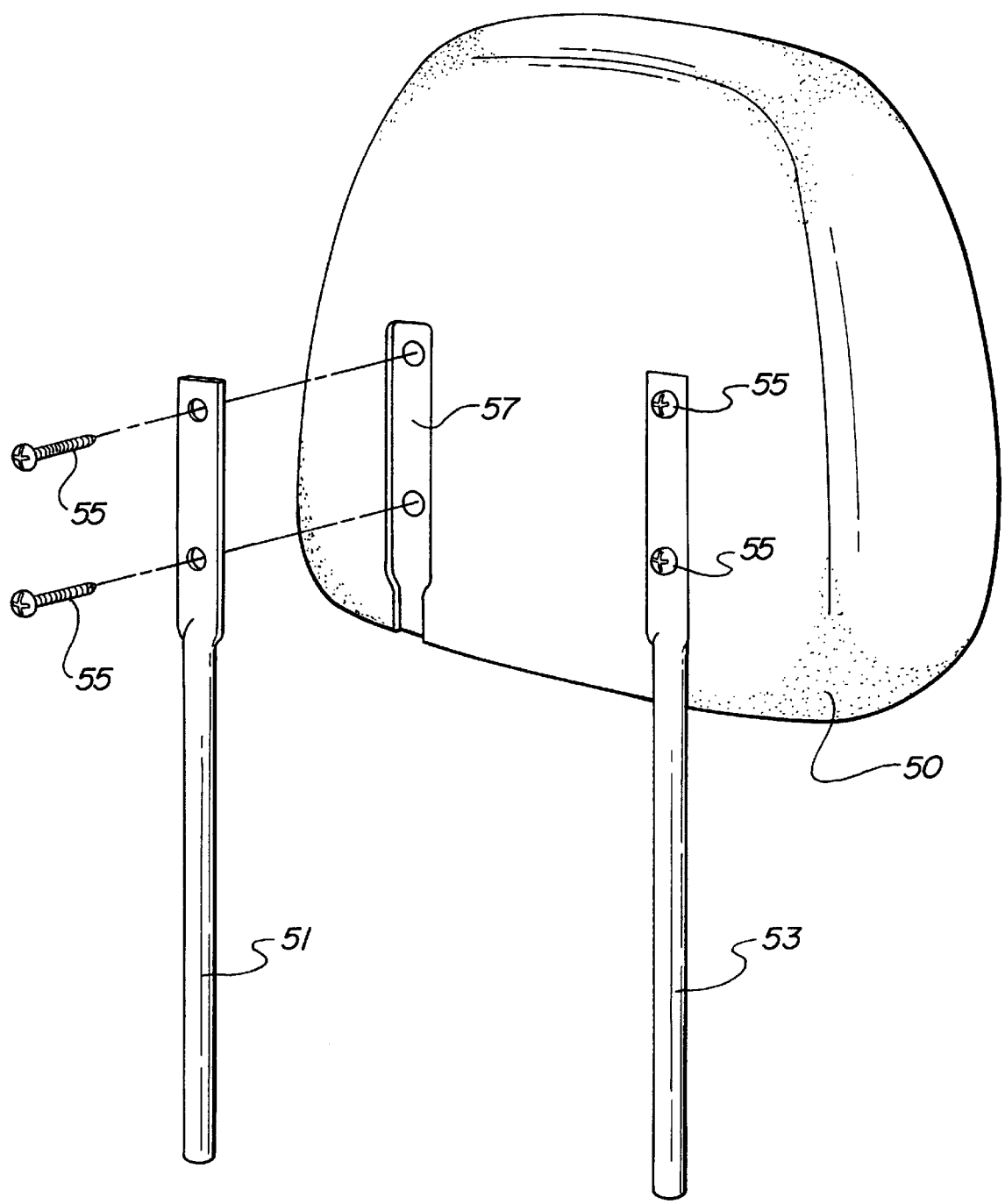
FIG. 5 is a perspective view of a headrest of a fourth embodiment of the present invention.

Referring now to FIG. 5, a fourth embodiment of the present invention is illustrated. In the fourth embodiment, the molded "bun" 50 is a hollow blow molded part. The frame structure comprises posts 51 and 53 are attached to the "bun" 50 by screws 55. Optionally, the "bun" can have recesses 57 for receiving the posts 51 and 53 so that each lies flush with the surface of the "bun" 50. Once the molded "bun" 50 is fully integrated, a trim cover as described above is applied to and closed about the molded "bun" 50.

It is now readily apparent that the present invention could be utilized to manufacture other interior automotive components such as armrests.

The above-described embodiment of the invention is intended to be an example of the present invention and alterations and modifications may be effected thereto, by those of skill in the art, without departing from the scope of the invention. It is, therefore, to be understood that, within the scope of the appended claims, the invention may be practiced other than as specifically described.

What is claimed is:

1. An automotive interior component comprising:

a frame structure for supporting said interior component;

a molded contoured bun having an outer surface and an inner surface with said inner surface defining a hollow cavity, said contoured bun being secured about a portion of said frame structure and forming a desired shape of said interior component;

a trim cover, having an interior surface and an exterior surface, enveloping said bun and conforming to said desired shape of said bun; and a sheet of foam padded material having a constant thickness and secured only to a portion of said interior surface of said trim cover, said trim cover and said foam padded material forming a pouch and enveloping said contoured bun, said pouch being closed at an underside of said bun to retain said pouch about said bun such that said pouch provides a measure of resilient padding to said interior component.

2. An automotive interior component as set forth in claim 1 wherein said frame structure includes a U-shaped tubular member defining by a pair of spaced apart parallel end posts extending from opposing ends of a cross-member, said cross-member and a portion of each of said posts disposed within said molded bun.

3. An automotive interior component as set forth in claim 1 wherein said bun is molded of polypropylene.

4. An automotive interior component as set forth in claim 1 wherein said bun is molded of polyethylene.

5. An interior component as set forth in claim 1 wherein said foam pad is a flexible urethane pad.

6. An automotive interior component as set forth in claim 1 wherein said foam padded material is flame laminated to said interior surface of said trim cover.

7. An automotive interior component as set forth in claim 1 wherein said foam padded material is tack sewn to said interior surface of said trim cover.

* * * * *